(12) United States Patent
Price et al.

(10) Patent No.: US 12,717,326 B2
(45) Date of Patent: Aug. 25, 2026

(54) SYSTEM AND METHOD FOR FORWARD PATH PLANNING OF CAB-TRAILER SYSTEMS

(71) Applicant: Genesee Valley Innovations, LLC, Santa Clara, CA (US)

(72) Inventors: Robert R. Price, Palo Alto, CA (US); Kent Evans, Cupertino, CA (US)

(73) Assignee: Genesee Valley Innovations, LLC, Santa Clara, CA (US)

( * ) Notice: Subject to any disclaimer, the term of this patent is extended or adjusted under 35 U.S.C. 154(b) by 342 days.

(21) Appl. No.: 17/493,464

(22) Filed: Oct. 4, 2021

(65) Prior Publication Data

US 2023/0108199 A1 Apr. 6, 2023

(51) Int. Cl.
*G05D 1/00* (2024.01)

(52) U.S. Cl.
CPC ......... *G05D 1/0214* (2013.01); *G05D 1/0238* (2013.01)

(58) Field of Classification Search
None
See application file for complete search history.

(56) References Cited

U.S. PATENT DOCUMENTS 9,321,483 B2 4/2016 Headly
2015/0158527 A1 6/2015 Hafner et al.
2017/0008560 A1 1/2017 Kyrtsos et al.
2018/0334188 A1* 11/2018 Maier ........................ G06T 7/13
2021/0070362 A1* 3/2021 Xu ........................ B62D 15/025
2021/0108935 A1* 4/2021 Koohi .................. G06Q 10/047

FOREIGN PATENT DOCUMENTS

CN 107628134 B * 6/2020
KR 20210116100 A * 9/2021 ............. G06F 3/038
SE 462695 B * 8/1990 ................ F42C 7/02
WO 2014185828 11/2014

OTHER PUBLICATIONS

Machine translation of CN107628134B (Yue) (Year: 2023).*
S. Manesis and V. Deligiannis, "Automata-based modeling and control of a truck and trailer vehicle equipped with a kingpin sliding mechanism", Sep. 2009, 2009 IEEE Conference on Emerging Technologies & Factory Automation (Year: 2009).*
Machine translation of CN-107628134-B (Yue) (Year: 2020).*
(Continued)

*Primary Examiner* — Navid Z. Mehdizadeh
*Assistant Examiner* — Sarah A. Mueller
(74) *Attorney, Agent, or Firm* — Krista A. Wittman

(57) ABSTRACT

A system and method for forward path planning of cab trailer systems is provided. Movement of a robot moving forward is tracked and a trajectory of at least one trailer attached to a back of the robot is estimated separate from a path of the robot. The trajectory of the trailer is based on the movement of the robot. A test for collision of one of the trailers is performed by identifying an obstacle and determining a distance of each trailer from the obstacle based on estimated trajectory. The trajectory of the robot is moved away from the obstacle when the distance fails to satisfy a threshold distance from the obstacle.

20 Claims, 7 Drawing Sheets

(56) References Cited

OTHER PUBLICATIONS

Machine translation of Bae et al. (KR-20210116100-A) (Year: 2021).*

Machine translation of Norberg (SE-462695-B) (Year: 1990).*

Claudio Altafini, Alberto Speranzon and Karl Henrik Johansson. "Hybrid Control of a Truck and Trailer Vehicle." International Workshop on Hybrid Systems: Computation and Control HSCC 2002.

Oskar Ljungqvist, "On motion planning and control for truck and trailer systems," Linköping University Thesis 2019.

Derrick H. Nguyen and Bernard Widrow. "Neural Networks for Self-Learning Control Systems." IEEE Control Systems Magazine. 1990.

Roland Stahn, Tobias Stark and Andreas Stopp, "Laser Scanner-Based Navigation and Motion Planning for Truck-Trailer Combinations," AIM 2007.

Morgan Quigley, Ken Conley, Brian P Gerkey, Josh Faust. "ROS: an open-source Robot Operating System." ICRA Workshop on Open Source Software 2009.

Christoph Rosmann, Wendelin Feiten, Thomas Wosch, Frank Hoffmann and Torsten Bertram. Efficient Trajectory Optimization using a Sparse Model. 2013 European Conference on Mobile Robots (ECMR).

* cited by examiner

SYSTEM AND METHOD FOR FORWARD PATH PLANNING OF CAB-TRAILER SYSTEMS

FIELD

This application relates in general to robots, and in particular to a system and method for forward path planning of cab-trailer systems.

BACKGROUND

Advances in technology have resulted in the popularity of robots for use in both recreational and business activities. Robots are commonly used to increase the efficiency of work being performed, such as to make products in a factory or to protect individuals from having to perform in dangerous situations, such as by utilizing bomb robots for instance. Often times, the robots are required to move from one location to another, such as the bomb robot moving in and through a building or a robot carrying supplies between work stations. Determining a safe path for the robot to travel is extremely important to prevent collisions with obstacles, such as other objects and people.

While there are existing frameworks for planning collision free paths for mobile robots, only some consider the use of trailers towed by the robot. Utilizing trailers with a robot can further increase efficiency. For example, robots that move packages or goods around a warehouse can greatly increase the amount of cargo carried by loading trailers affixed to the robots. Multiple trailers can also be attached and detached from a single robot tractor to reduce the need for loading and unloading the robot itself. High resolution A-star grid search algorithms can be used for path planning for forward moving trailers, but are too slow for real time operation on embedded systems in the face of dynamic obstacles. Such systems would require significant computational power leading to additional cost, weight and power consumption.

The backup movement of a robot has attracted a lot of academic attention for its non-linearity. In many practical robotics transport applications, such as virtual conveyor belts, the robot only moves forward from station to station. However, there are challenges to existing algorithms, even in the case of forward motion. Namely, existing algorithms for forward motion fail to account for the fact that during turns, the trailer can track to the inside of the robot's path. This means that a path which is clear for the robot may still result in the towed trailer intersecting with obstacles and is particularly true of the popular class of algorithms which construct paths from sequences of straight segments and minimum radius turns. For example, controlling cab-trailer systems have focused on the non-linearity required to backup cab-trailer constellations in constrained static situations. The truck backer upper, as described in Derrick H. Nguyen and Bernard Widrow, Neural Networks for Self-Learning Control Systems, IEEE Control Systems Magazine, 1990, used a pair of networks to model dynamics of the system and provide control. The system provided non-linear control, but did not account for obstacles.

Integrating neural methods with an overall planning system with general parametric goal states can be difficult. Attempts to introduce formal models into non-linear control can employ a hybrid model that combines a switching state machine with linear quadratic controllers for each state, as described in Claudio Altafini, Alberto Speranzon and Karl Henrik Johansson. Hybrid Control of a Truck and Trailer Vehicle. International Workshop on Hybrid Systems: Computation and Control HSCC 2002. However, the switching logic must be explicitly designed and the control theoretic solvers have no easy method of integrating dynamic obstacles into the control process.

An explicit state machine and switching logic can be replaced with a two-layer model. On motion planning and control for truck and trailer systems, cab trailer control can be split into a high-level planning problem using randomized graph search (RRT) in high-dimensional configuration space together with a lower-level linear quadratic controller that follows links in the RRT graph. Such an approach solves the problem of switching, but still does not address dynamic obstacles. See, Morgan Quigley, Ken Conley, Brian P Gerkey, Josh Faust. ROS: an open-source Robot Operating System. ICRA Workshop on Open Source Software 2009). Explicit incorporation of obstacles can be easily done with a high-dimensional grid of configuration space searched by A-star, as described in Roland Stahn, Tobias Stark and Andreas Stopp, Laser Scanner-Based Navigation and Motion Planning for Truck-Trailer Combinations, AIM 2007. However, conducting searches of high dimensional grids, such as a 5D grid, is computationally intensive. Computation directly affects cost and battery life of the robot. A multi-resolution approach can be used to find reversal points before performing a search on a fine grid to get trajectory points. The system is able to take into account static obstacles acquired, such as by a LIDAR scanner.

Accordingly, the ability to plan paths for robots towing trailers in a forward direction in environments with dynamic obstacles is needed. Preferably, such path planning will not be computationally expensive and will focus on a forward motion of mobile robots in real time via embedded hardware. Further, a trajectory of each trailer can be determined even though a location of the trailer is not known nor tracked.

SUMMARY

An embodiment provides a system and method for forward path planning of cab trailer systems. Movement of a robot moving forward is tracked and a trajectory of at least one trailer attached to a back of the robot is estimated separate from a path of the robot. The trajectory of the trailer is based on the movement of the robot. A test for collision of one of the trailers is performed by identifying an obstacle and determining a distance of each trailer from the obstacle based on estimated trajectory. The trajectory of the robot is moved away from the obstacle when the distance fails to satisfy a threshold distance from the obstacle.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
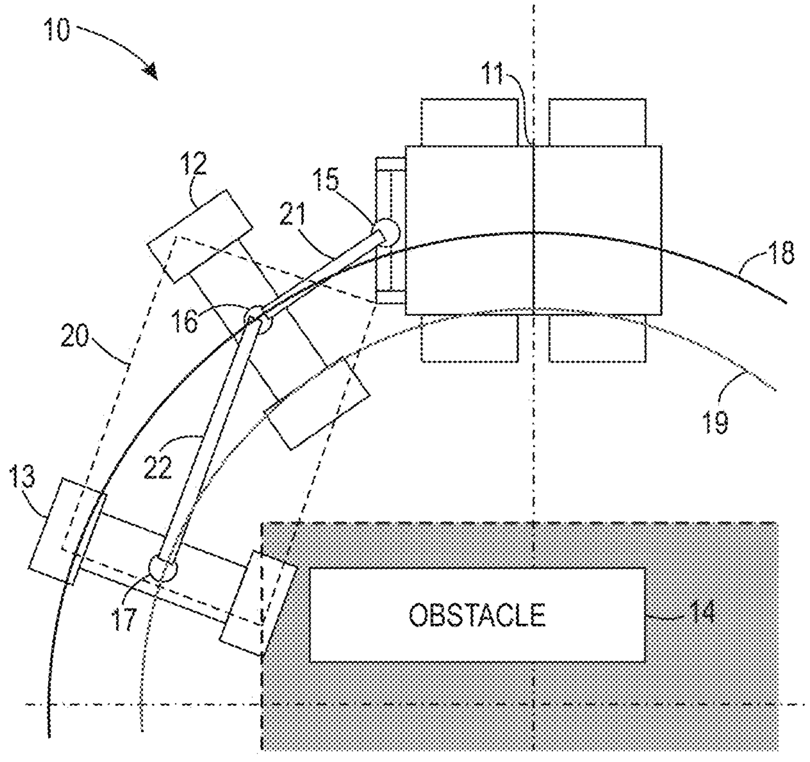
FIG. 1 is a block diagram showing, by way of example, a cab trailer system.

The ability to plan a path of a robot in real time is important to increase efficiency and prevent collisions. When the robot is traveling forward along a straight path or nearly straight path, any trailers attached to a back of the robot will follow behind the robot. However, when the robot is following a circular path corresponding to a turn, the trailer(s) may track to the inside of the robot's circular path. Many existing path planning techniques fail to consider the movement of a trailer inside the robot's path during a turn, which can cause the trailer to hit an obstacle that was missed by the robot itself. To be able to react to dynamic obstacles in real time, the path planning can be split into a global planner that chooses a route and a local planner that provides a detailed plan that avoids obstacles and respects robot kinematics.

Local planning can utilize a model-predictive control like a scheme in which an extended plan is made to achieve a distant goal and then a single step of the plan is executed. The robot then senses its position and makes a new plan. In this way, the robot's actions take into account longer term dependencies, but also can react to a changing environment and the planning is very robust to model misspecification as errors are corrected after every step and do not accumulate as they would in open loop forward planning.

The "Time Elastic Band" (TEB) planner, as described in Rosman 2013 is a popular local planner that takes a global path segment and introduces additional waypoints, assigns them to specific times and perturbs the location and orientation of these points to avoid obstacles and satisfy kinematics constraints on velocity and acceleration caps. The planner is very fast and in combination with model predictive control, produces robust real time plans in the face of dynamic obstacles. Specifically, obstacle constraints are inserted between waypoints and obstacles in the map. Obstacle constraints introduce a penalty for waypoints that are too close to the obstacle. The kinematics constraints are based on the observation that one can construct an optimal path for any situation by composing a sequence of straight-line segments and minimum turn radius/maximum angular velocity. Thus, waypoints in any kinematically valid path segment must either fall on a straight line or on a segment of a circle with fixed radius. The orientations should align with the tangent of the curve at the waypoint's location. A penalty is introduced for waypoints that depart from one of these models.

An optimization is then performed to move the position and orientation of path way points to minimize the penalties. Since the optimization starts with the global planner's solution, the optimization is typically fast.

However, the existing TEB model only handles robots that have a single rigid convex footprint. This works well as many mobile robots are physically designed to be convex to minimize possible snarls on objects in the environment. However, the TEB algorithm does not ensure that a trailer positioned behind the robot clears obstacles and it is not straight forward to express the dynamics of the trailer segments as invariant constraints as the motion of the trailer depends on its present orientation. One possibility is to write out the partial differential equations that express the motion of the trailer segments as a function of the robot motion, but these need to be forward integrated to understand how the trailer moves. The equations also need to know the starting position and orientation of the trailer, which is not known as the robot does not have sensors to detect the trailer state.

To solve this problem, including the shortcomings of the TEB planner, assumptions can be made, such as an assumption that the trailer transitions quickly between steady state modes. In a linear case, when the robot is travelling in a straight line, the trailer is also in a straight line behind the robot. In a turning case, if the robot proceeds long enough in the turn, the trailer will eventually fall onto a circular path somewhat inside the robot's path. So, an assumption can be made that the trailer is travelling on a circle defined by the hitch and trailer segment geometry. In some sense, this is a conservative worst-case solution as it assumes the trailer is maximally tracking to the inside of the robot.

Using such assumptions, a determination can be made that a trailer cab behind the robot will hit an obstacle that is missed by the robot. FIG. 1 is a block diagram showing, by way of example, a cab trailer system 10. The cab trailer system 10 includes a robot 11 with a trailer 20 having a first trailer segment 12 and a second trailer segment 13. In a different embodiment, the trailer 20 can include more or less than two trailer segments. Each trailer segment can include an axle and a wheel on each end of the axle, and is located underneath the trailer. One or both of the trailer segments can include a pivot joint 16.

A first trailer segment 12 can be located closest to the robot and affixed to a back of the robot 11 via a rod 21. The rod 21 is connected to a hitch 15 on the back of the robot 11 and rigidly to joint 16 positioned at a center of the first trailer segment 12 to connect the first trailer segment 12 to a bottom surface of the trailer. In one embodiment, the first trailer segment 12 can be positioned on one end of the trailer, while the second trailer segment 13 can be positioned on the opposite end of the trailer. The pivot joint 16 allows the first trailer segment to pivot underneath the trailer. The first trailer segment can include a bogey style articulation.

The second trailer segment 13 is affixed to the first trailer segment 12 via a rod 22 that is attached to the pivot 16 on the first trailer segment 12 and a fixed joint 17 connecting a center of the second trailer segment 13 with the trailer. The fixed joint 17 of the second trailer segment 13 can be located on an end of the trailer 20 opposite the first trailer segment 12. Additional trailer segments can be attached to trailer segment 13 for larger trailers and additional trailers can be attached to the trailer 20 to form extended "trains."

Alternatively, a trailer segment can have independent forward wheels on casters or wheels with linkages, such as Ackerman steering. As long as the trailer travels on a circle, the exact mechanism used for turning of the trailer is not important.

A path 18 followed by a center of the robot is measured, as well as a path 19 followed by a back of the trailer. As the robot 11 moves around a curve, the trailers behind the robot can begin to follow a different path, rather than following the same path as the robot. Specifically, as the robot makes a turn, the trailer or trailers tend to move inside of the robot's path. In one example, the sharper the turn the robot makes, the more the trailer moves inside of the robot's path. Based on a tendency of a trailer to move to the interior of the robot's path, the trailer may collide with an obstacle 14 that was previously missed by the robot 11. As the trailer is not directly articulated nor sensed, the location of the trailer or trailer segments is not known. Accordingly, the path of the trailer via the second or last segment is approximated based on a function of the robot's positions.

Figure 2:
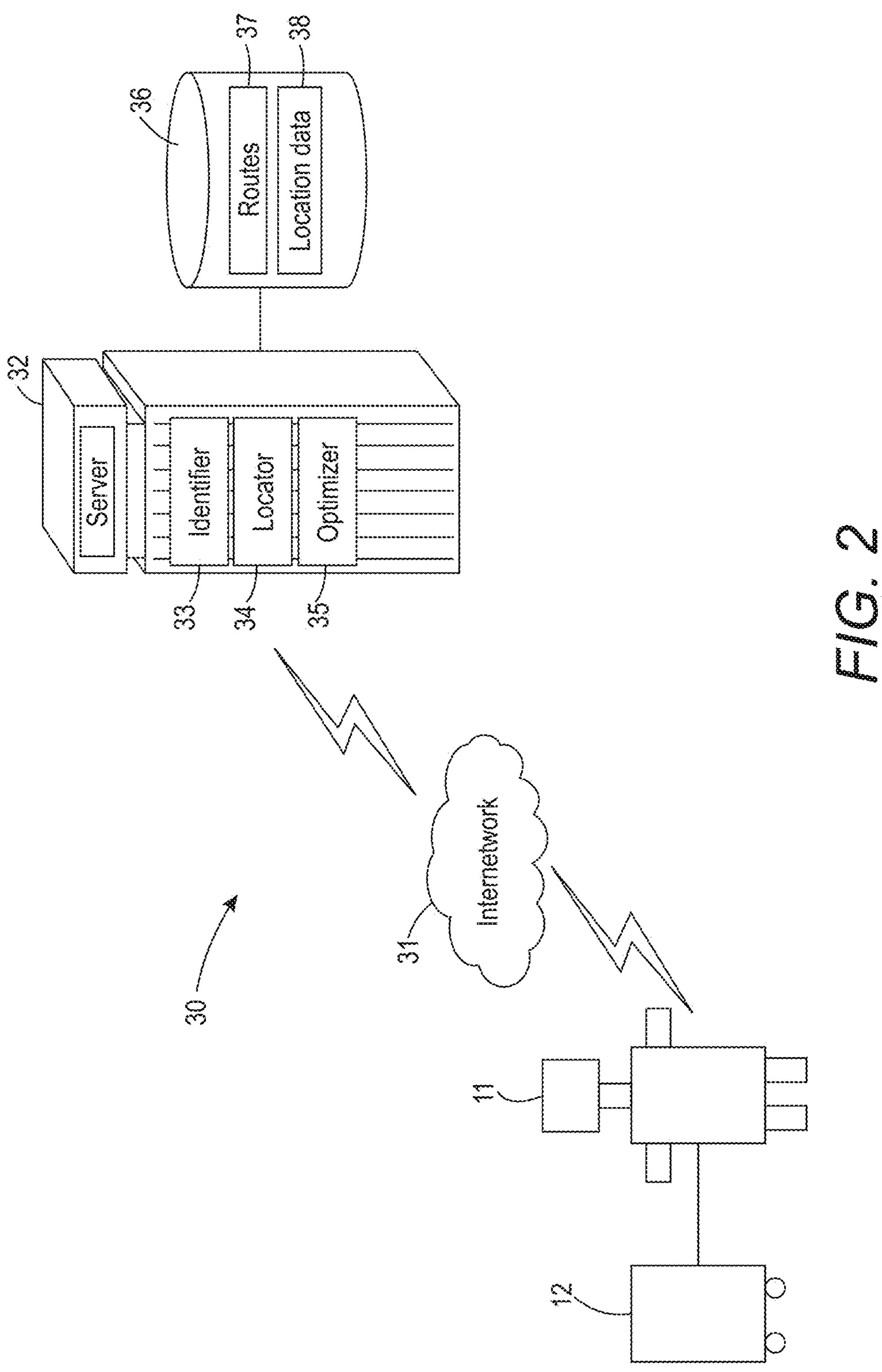
FIG. 2 is a block diagram showing a system for forward path planning of cab trailer systems, in accordance with one embodiment.

Determining a location and orientation of each trailer segment of each trailer in real time can help determine whether a path of the robot should be moved based on whether one or more of the trailer segments are likely to collide with an obstacle missed by the robot. FIG. 2 is a block diagram showing a system 30 for forward path planning of cab trailer systems, in accordance with one embodiment. A robot 11 has at least one trailer 12 attached to a back side of the robot. Information collected by the robot 11, such as location information 38, is provided to a server 32 via in internetwork 31, such as the Internet. The collected information 38 is stored in a database 36 that is interconnected to the server 32. Routes 27 of the robot 11 are also stored in the database 36.

The server 32 includes an identifier 33, locator 24, and optimizer 34. The identifier 33 identifies an obstacle located near the robot or one or more trailers behind the robot. The locator 34 determines a location and orientation of the trailer segments of each trailer behind the robot assuming steady state turning. The optimizer 35 determines if one such trailer is on a path that will result in a collision with an obstacle, and if so, can provide instructions for moving a trajectory of the robot and implicitly, the associated trailers. The instructions are provided to the robot to move according to the new trajectory. In a further embodiment, a hardware processor is located in the robot for determining a trajectory of the trailer segments and preventing collision with an obstacle.

Figure 3:
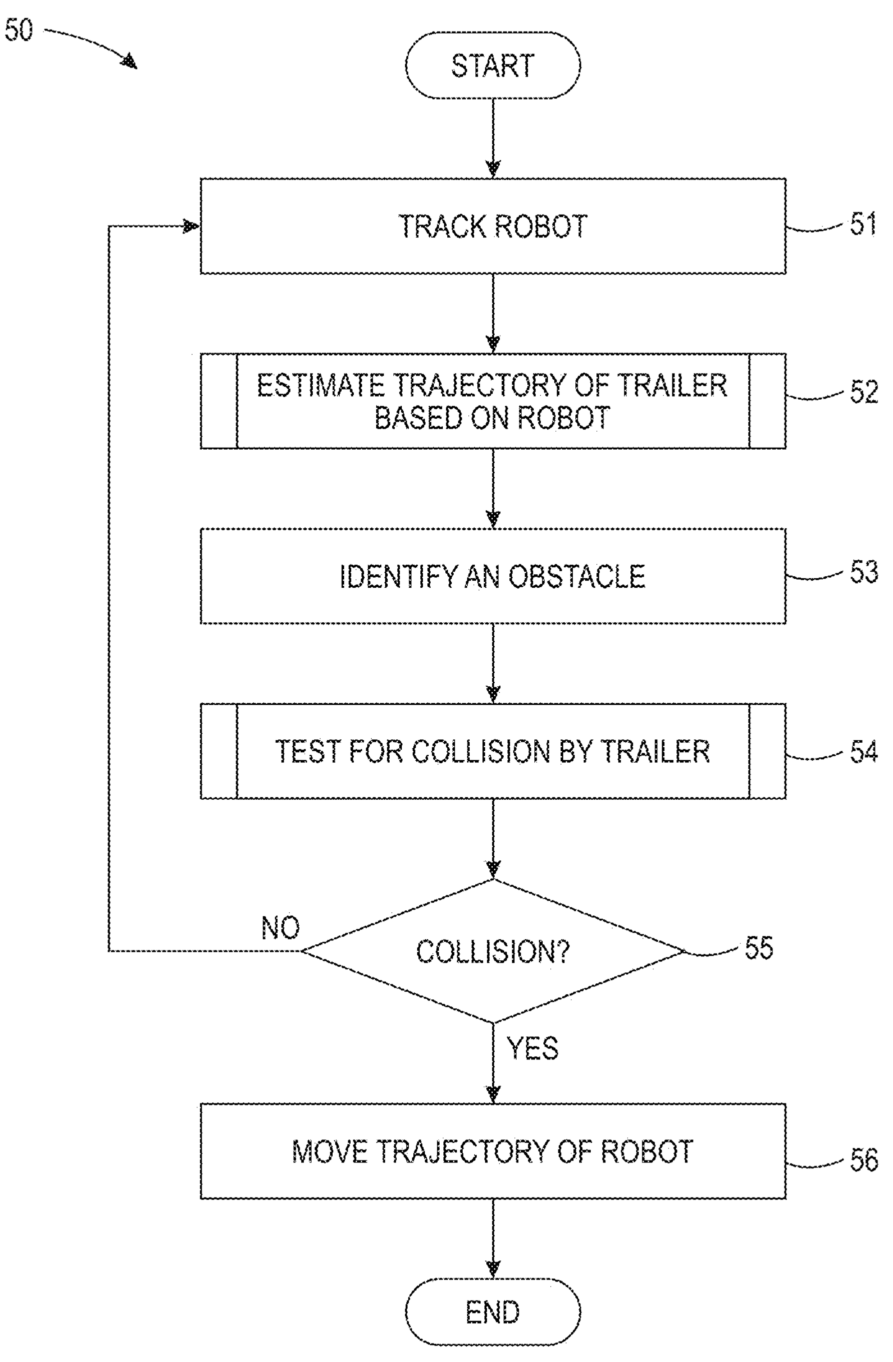
FIG. 3 is a process diagram showing a method for forward path planning of cab trailer systems, in accordance with one embodiment.

When travelling along a substantially straight line, trailer segments tend to follow directly behind a robot. However, when the robot turns, the paths of the trailer segments start to differ from the path of the robot. FIG. 3 is a process diagram showing a method 50 for forward path planning of cab trailer systems, in accordance with one embodiment. A robot with one or more trailers follows a planned path. A location of a robot is tracked (step 51) along the path to determine whether a collision with a dynamic obstacle may occur. A trajectory of each trailer segment of the trailers affixed behind the robot is estimated (step 52) based on an assumption that the trailer can sometimes travel on a different path than the robot, such as during turns. The different paths travelled by the trailers can be assumed to be a circle defined by a hitch of the robot and trailer segment geometry, which can include the trailer maximally tracking to the inside of the robot's path. Determining the estimated trajectories is discussed in detail below with respect to FIG. 5.

An obstacle near the path of the robot or one or more of the trailers behind the robot is identified (step 53) and a test is performed to determine (step 54) whether the robot or one of the trailers will collide with the identified collision via a trailer segment. Identifying whether a collision will occur is further described below in detail with respect to FIG. 6. If a collision is expected to occur (step 55), a trajectory of the robot is moved. Otherwise, is no collision is identified (step 55), the robot continues along the originally planned path and the location of the robot is tracked (step 51).

Figure 4:
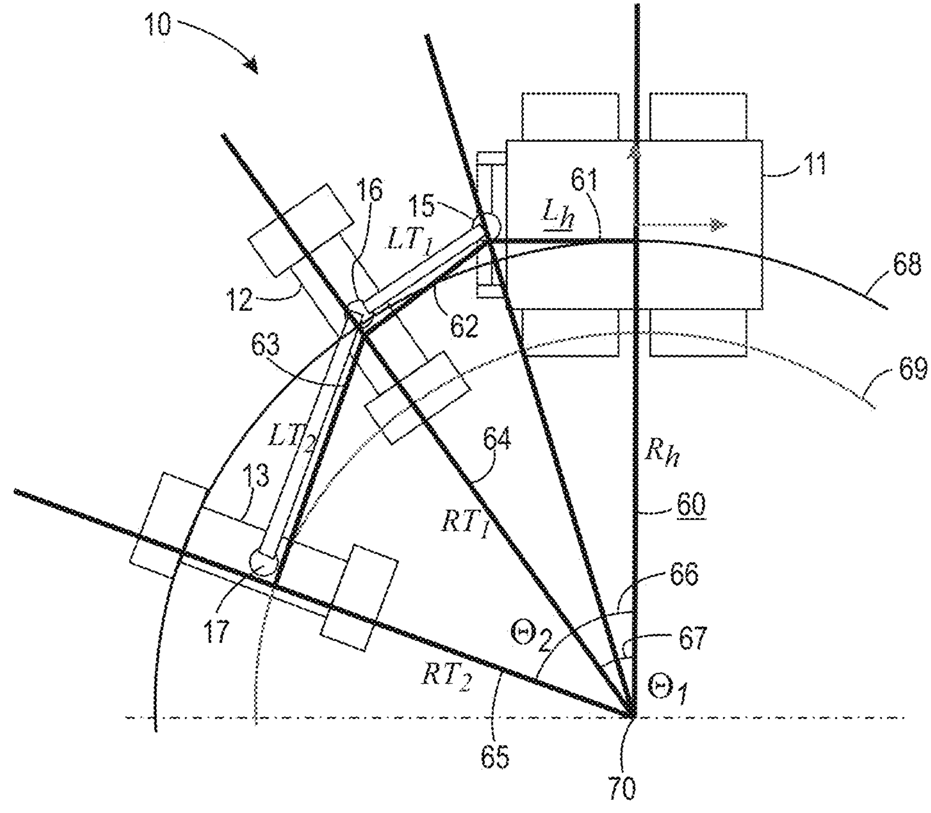
FIG. 4 is a block diagram showing, by way of example, a cab trailer system 10 making a turn.

As the trailer is not directly articulated nor sensed, the location of the trailer segment is not known. Accordingly, the path or trajectory of the trailer segment must be predicted from a model. This could be done by forward integrating the differential equations for the trailer motion, but this is slow and hard to express as a symmetric constraint between locations in the local path optimizer. Instead, the trailer position is approximated based on a function of the robot's positions in a way that takes advantage of the fact that the robot will already have cleared the path it travels during forward motion. FIG. 4 is a block diagram showing, by way of example, a cab-trailer system 10 making a turn. The cab-trailer system includes a robot 11 and a trailer behind the robot with two trailer segments 12, 13. A turning radius $R_H$ 60 of the robot is known, as well as the geometric parameters of the hitch offset $L_H$ 61 and trailer segment lengths $L_{T_1}$ 62 and $L_{T_2}$ 63. The turning radius $R_H$ 60 is a radius of the smallest circle made by the robot. The hitch offset $L_H$ 61 can be measured from a center of the robot to the hitch 15 on a back end of the robot. The trailer segment length $L_{T_1}$ 62 can be measured from the hitch 15 of the robot to a pivot joint 16 or center of a first trailer segment 12 directly behind the robot. The trailer segment length $L_{T_2}$ 63 can be measured from the pivot joint 16 or center point of the first trailer segment 12 to a pivot joint 17 or center of a second trailer segment 13 located behind the first trailer segment 12.

Based on the known values for the turning radius of the robot, the hitch offset and trailer segment lengths, a location and orientation of each of the trailer segments can be determined, assuming steady state turning, by determining a turning radius $R_{T_1}$ 64 for the first trailer segment, a turning radius $R_{T_2}$ 65 for the second trailer segment, an angle $\theta_1$ 67 from the turning radius 60 of the robot to the turning radius 64 of the first trailer segment, and an angle $\theta_2$ 66 from the turning radius 64 of the first trailer segment to the turning radius 65 of the second trailer segment. Specifically, the turning radii of the trailer segments and the angles can be determined using the equations listed below:

$$R_{T_1} = \sqrt{(L_H)^2 + (R_H)^2 - (L_{T_1})^2}$$

$$R_{T_2} = \sqrt{(L_H)^2 + (R_H)^2 - (L_{T_1})^2 - (L_{T_2})^2}$$

$$\theta_1 = \tan^{-1}\left(\frac{L_H}{R_H}\right) + \tan^{-1}\left(\frac{L_{T_1}}{\sqrt{(L_H)^2 + (R_H)^2 - (L_{T_1})^2}}\right)$$

$$\theta_2 = \theta_1 + \tan^{-1}\left(\frac{L_{T_2}}{\sqrt{(L_H)^2 + (R_H)^2 - (L_{T_1})^2 - (L_{T_2})^2}}\right)$$

$$L_H, L_{T_1}, L_{T_2}, R_H \text{ all known}$$

Once the robot reaches steady state, all of the circles for the robot and trailer segments share a common origin 70—otherwise they would not turn together, and the system would come apart. The common origin, together with the linkages of the trailers, the position and orientation of each trailer segment are fully constrained. Therefore, knowing the angles and radius of the trailer segments from this origin allow us to determine the farthest outboard location of the trailer segments assuming steady state turns and the orientation of the trailer segments. The turning radii and angles can be used to determine a path 69 for an end of the trailer relative to the path 68 of the robot, which is described below in further detail with reference to FIG. 5. Projecting the relative path of the trailer into the robot frame gives the approximate absolute path of the trailer in world coordinates.

Figure 5:
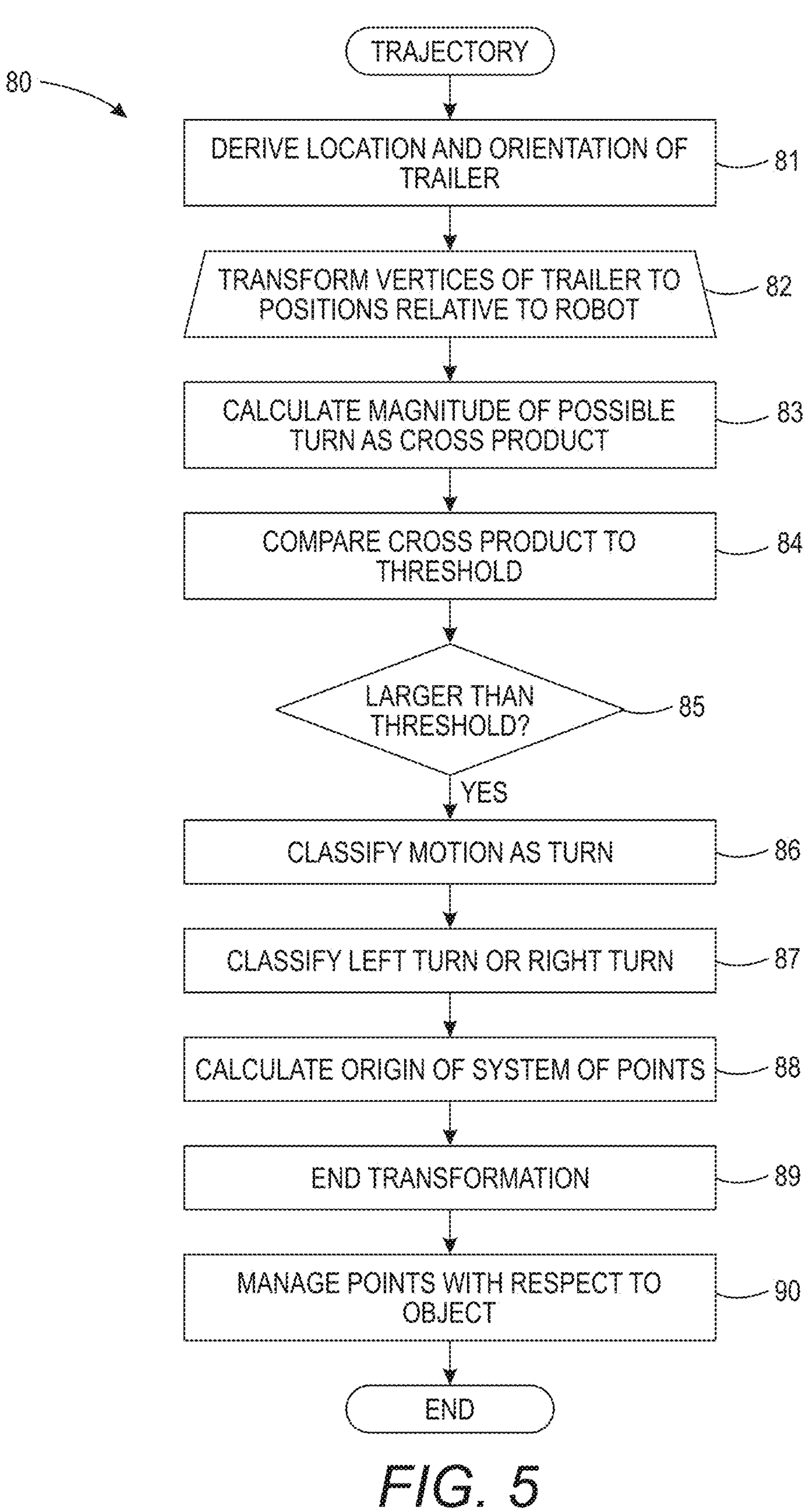
FIG. 5 is a flow diagram showing, by way of example, a process 60 for determining a trajectory of a trailer segment.

To determine the trajectory of the trailer, the calculated turning radii of the trailer segments and the angles can be used to transform vertices V1, V2, . . . ,Vk, such as located at the pivot joints or centers of the trailer segments, to positions V1',V2', . . . ,Vk' relative to the robot during the turn. FIG. 5 is a flow diagram showing, by way of example, a process 80 for determining a trajectory of a trailer, such as by a trailer segment. The last trailer segment of the last trailer can be determined since the last trailer is the furthest from the robot and can travel to the inside of the robot's path more than the preceding trailers. Specifically, the trajectory last trailer segment of the last trailer can be determined. Alternatively, the trajectories of all the trailer segments and/or trailers can be determined.

As described above, the location and orientation of the trailer is determined (step 81). Vertices, located at a center of each of the trailer segments, can be transformed (step 82) to a position relative to the robot.

To transform the vertices, a magnitude of the turn by the cab trailer system is calculated (step 83) by taking the cross product of the orientations of subsequent poses or positions of the robot. Averaging over multiple robot poses gives a better estimate of the robot's current turn rate. A pose of the robot at each of the three points is determined to find the magnitude of the turn, which along with the radius of curvature and average can be used to determine a location of the trailer segment even though location of the trailer segment is not tracked like the robot. For example, points of the robot can be obtained, including a previous turn point, a current turn point, and a next turn point along the planned path of the robot. In one embodiment, a sliding window can be used to determine the points. An average of the turn points is determined to define a circle that the robot is following.

A cross product is determined for two of the turn points of the robot. In one example, the cross product can be calculated between the angular orientation vector of a first point and the angular orientation vector of the second point on the robot's path, while a further cross product can be calculated between a second point and a third point for the robot. The cross products of the first and second points and the second and third points are averaged. The average is obtained to avoid relying on the maximum turn assumption.

Due to errors in localization (both position and orientation) of the robot, there may be an apparent turn in the robot's path which is really due to localization error. These tend to be small, but if these perturbations are left in, they can result in apparent oscillation of the trailer from side to side which can prevent optimization of the path from converging. To filter out these pseudo turns, the absolute magnitude resulting from the averaged cross products is compared (step 84) to an empirically determined threshold. If the calculated magnitude is larger (step 85) than the threshold, motion of the robot between subsequent poses is classified (step 86) as a "turn," otherwise it is considered a "straight path." For example, if a turn is associated with an angle less than a predetermined threshold, the robot is considered to be following a straight path. However, if the angle is more than the predetermined threshold, than the robot is turning or moving into a turn. Further, the turn can be determined to be a tight turn versus a moderate turn. For example, the turn is considered to be proportional to the average cross-product.

If the sign of the cross product is positive, the robot can be identified (step 87) as turning left. Alternatively, if the cross product is negative, the robot can be identified as turning right. Based on whether the robot is on a straight path or in a turn, a calculation (step 88) is made as to where an origin of the vertices of the trailer segment will be placed with respect to the robot model (step 89). Distances between the transformed trailer vertices and obstacles can then be determined and used to compute (step 90) danger penalties.

Figure 6:
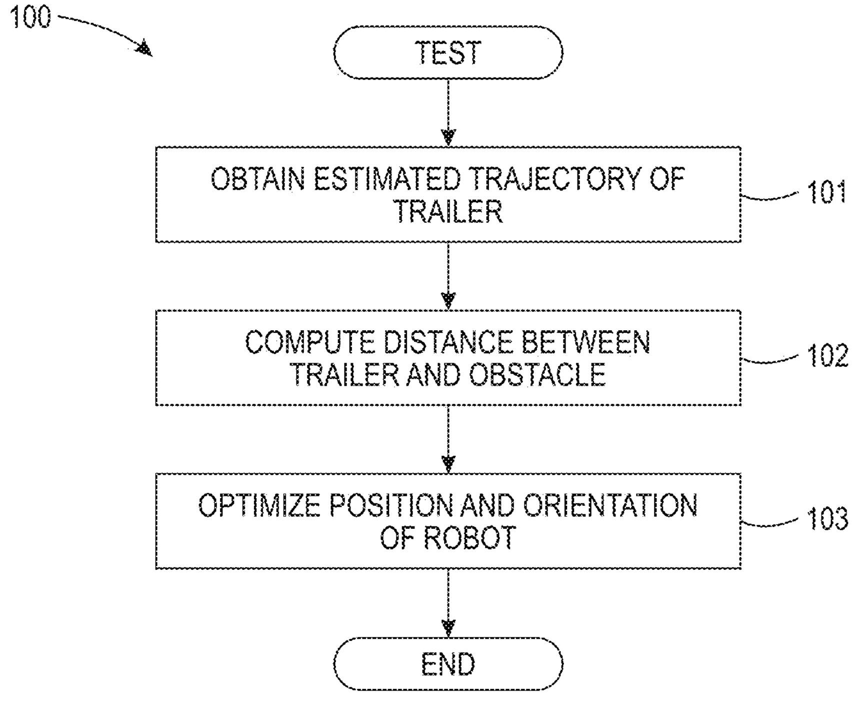
FIG. 6 is a flow diagram showing, by way of example, a flow diagram showing, by way of example, a process for testing whether a trailer segment will hit an obstacle that was missed by a robot to which the trailer segment is attached.

Once the path of the trailer segment has been approximated, a determination as to whether the trailer segment will collide with an obstacle can be made. FIG. 6 is a flow diagram showing, by way of example, a flow diagram showing a process 100 for testing whether a trailer segment will hit an obstacle that was missed by a robot to which the trailer segment is attached. The estimated trajectory of the trailer segment, as described above with respect to FIG. 5, is obtained (step 101). The distance between the trailer segment and obstacle is determined (step 102) using the transformed vertices of the approximated trajectory. This test can be handled by an existing planner, such as the Time Elastic Band planner (TEB).

A position of the robot and its orientation can then be optimized (step 103) via the TEB algorithm using the G20 optimizer to minimize danger of both robot and trailer colliding with obstacles. Optimization can require a graph optimizer that minimizes an error function of nodes representing the robot positions or locations. Constraints, such as kinematic constraints and obstacle constraints, can be added into the optimization between the obstacles and the steady state calculation of the trailer segments. The constraints can include links between one or more of the nodes and can represent an error function that penalizes deviations from the goal. If, for instance, the goal is for the robot to drive in a straight line, an error function that grows larger as the poses get further away from being in a straight line is constructed. The error function is typically minimized by solving a matrix equation.

An example of a constraint can include the robot poses must obey non-holonomic kinematic constraints, such that the robot should not be able to move purely sideway, similar to how a car does not move sideways. There is an error function that checks if two subsequent poses satisfy this constraint, such as do the poses lie on a circle or does the radius of the circle violate the minimum turning radius? Subsequently, an error proportional to how far off the poses are from the circle is determined.

The forward path planning of the robot and trailers allows the trailer segment positions to also be expressed in terms of simple circular constraints that can be added to a perturbation optimizer in a natural and convenient manner.

The constraints are formulated and provided to the G20 optimizer, although other optimizers can be used. The constraints are set conditions for variables that are required to be satisfied or penalized with respect to the robot's path. The kinematic constraints affect velocity and acceleration, while the obstacle constraints are related to a distance of the obstacle from a trailer segment. These constraints push the robot outwards from corners of obstacles to ensure collision free paths. Specifically, the trajectory of the robot is moved to prevent collision between one of the trailer segments and an obstacle.

Figure 7:
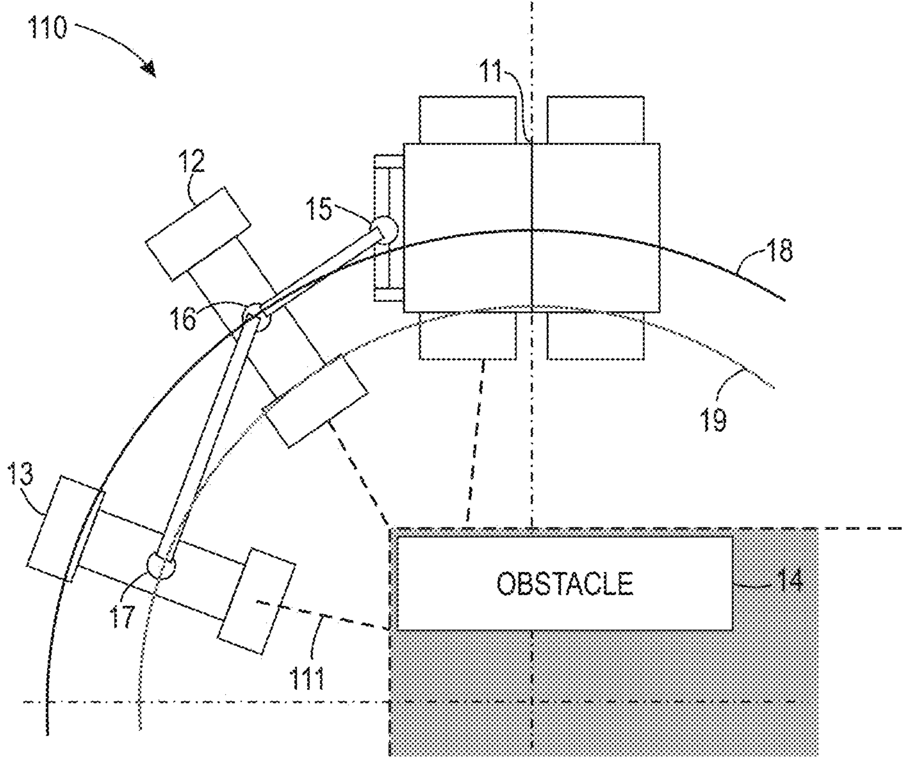
FIG. 7 is a block diagram showing, by way of example, a cab trailer system 10 along a different trajectory.

Once the trajectory of the robot is moved, the trailer is able to move past the identified obstacle without collision. FIG. 7 is a block diagram showing, by way of example, a cab trailer system 110 along a different trajectory. Once, a path of the robot 11 has been moved to account for the trailer located behind, the trailer segments of the trailer move along a different trajectory to avoid hitting the obstacle 14 as indicated by distance 111 between the trailer segment 13 and obstacle 14.

While we illustrate the method using a trailer with a bogey style front articulation, the method can be readily adapted to trailers that have independent front wheels such as the Ackerman steering model. In the Ackerman model, each wheel runs on its own circle. A system of equations is solved such that the circle of each wheel falls at the same center as the robot's center of rotation and that the wheels are connected by a rigid beam that connects their tangent points and that the hitch attaches rigidly to the center of this beam. A single semi-trailer that relies on the hitch to support the load simply omits the second trailer segment.

While the invention has been particularly shown and described as referenced to the embodiments thereof, those skilled in the art will understand that the foregoing and other changes in form and detail may be made therein without departing from the spirit and scope of the invention.

What is claimed is:

1. A system for forward path planning of cab trailer systems, comprising:

a robot; and a computer processor associated with the robot and configured to:

track movement of a robot moving forward along a path;

approximate, using a model, a trajectory of at least one trailer attached to a back of the robot that is different from the path of the robot to which the at least one trailer is attached wherein the trajectory is based on the movement of the robot and the model is based on a function of the robot's positions at each of multiple points determined using a sliding window and comprising two or more of a previous turn point, a current turn point, and a next turn point along a planned path of the robot, and further wherein a cross product is calculated between each of two different combinations of the turn points and then averaged; and test for collision of one of the trailers, comprising:

identify an obstacle;

determine a distance of the trailer from the obstacle based on the estimated trajectory;

determine that the trailer will collide with the obstacle along the estimated trajectory even when the robot will not collide with the obstacle, when the distance fails to satisfy a threshold distance from the obstacle; and move the trajectory of the robot away from the obstacle, wherein the robot travels along the moved trajectory on the surface to prevent collision of the trailer with the obstacle.

2. A system according to claim 1, wherein the moved trajectory of the robot results in a change of the trajectory.

3. A system according to claim 1, wherein the processor is configured to determine the trajectory, comprising:

determining a magnitude of the averaged cross products; and comparing the magnitude to a threshold.

4. A system according to claim 3, wherein the processor is configured to classify the movement as a turn when the magnitude exceeds the threshold and to classify the movement as following a line when the magnitude is below the threshold.

5. A system according to claim 1, wherein the distance is determined by transforming for the trailer, a vertex comprising a center of one or more trailer segments relative to one of the positions of the robot and comparing the vertex to a location of the obstacle.

6. A system according to claim 1, wherein the trajectory is estimated by determining a magnitude of a turn by the robot based on the averaged cross product.

7. A system according to claim 6, wherein the processor is configured to perform at least one of identifying a left turn when the averaged cross product is positive and identifying a right turn when the averaged cross product is negative.

8. A method for forward path planning of cab trailer systems, comprising:

tracking movement of a robot moving forward along a path;

approximating, using a model, a trajectory of at least one trailer attached to a back of the robot that is different from the path of the robot, wherein the trajectory is based on the movement of the robot to which the at least one trailer is attached and the model is based on a function of the robot's positions at each of multiple points determined using a sliding window and comprising two or more of a previous turn point, a current turn point, and a next turn point along a planned path of the robot, and further wherein a cross product is calculated between each of two different combinations of the turn points and then averaged; and testing for collision of one of the trailers, comprising:

identifying an obstacle;

determining a distance of the trailer from the obstacle based on the estimated trajectory;

determining that the trailer will collide with the obstacle along the estimated trajectory even when the robot will not collide with the obstacle, when the distance fails to satisfy a threshold distance from the obstacle; and moving the trajectory of the robot away from the obstacle, wherein the robot travels along the moved trajectory on the surface to prevent collision of the trailer with the obstacle.

9. A method according to claim 8, wherein the moved trajectory of the robot results in a change of the trajectory.

10. A method according to claim 8, further comprising:

determining a magnitude of the averaged cross products; and comparing the magnitude to a threshold.

11. A method according to claim 10, further comprising one of:

classifying the movement as a turn when the magnitude exceeds the threshold; and classifying the movement as following a line when the magnitude is below the threshold.

12. A method according to claim 8, wherein the distance is determined, comprising:

transforming for the trailer, a vertex comprising a center of one or more trailer segments relative to one of the positions of the robot; and comparing the vertex to a location of the obstacle.

13. A method according to claim 8, wherein the trajectory is estimated, comprising:

determining a magnitude of a turn by the robot based on the averaged cross product.

14. A method according to claim 13, further comprising at least one of:

identifying a left turn when the averaged cross product is positive; and determining a right turn when the averaged cross product is negative.

15. A method for forward path planning of cab trailer systems, comprising:

tracking movement of a robot moving forward along a path;

approximating, using a model, a trajectory of at least one trailer attached to a back of the robot based on a position of each of two or more segments of the trailer with respect to the robot and the model is based on a function of the robot's pose at each of multiple points determined using a sliding window and comprising at least two of a previous turn point, a current turn point, and a next turn point, and further wherein a cross product is calculated between each of two different combinations of the turn points and then averaged;

testing for collision of one of the trailers, comprising:

identifying an obstacle;

determining a distance of the trailer from the obstacle based on the trajectory;

determining that the trailer will collide with the obstacle along the estimated trajectory, even when the robot will not collide with the obstacle, based on the distance; and moving the trajectory of the robot away from the obstacle, wherein the robot travels along the moved trajectory on the surface to prevent collision of the trailer with the obstacle.

16. A method according to claim 15, further comprising:

determining a magnitude of the averaged cross products; and comparing the magnitude to a threshold.

17. A method according to claim 15, further comprising one of:

classifying the tracked movement of the robot as a turn when the magnitude exceeds the threshold; and classifying the tracked movement of the robot as following a line when the magnitude is below the threshold.

18. A method according to claim 15, wherein the distance is determined, comprising:

transforming for the trailer, a vertex comprising a center of one or more trailer segments relative to one of the poses of the robot; and comparing the vertex to a location of the obstacle.

19. A method according to claim 15, wherein the trajectory is estimated, comprising:

determining a magnitude of a turn by the robot based on the average cross product.

20. A method according to claim 19, further comprising at least one of:

identifying a left turn when the average cross product is positive; and determining a right turn when the average cross product is negative.

* * * * *